United States Patent
Drexler et al.

(10) Patent No.: US 10,249,220 B2
(45) Date of Patent: Apr. 2, 2019

(54) HARDENED WHITE BOX IMPLEMENTATION 2

(71) Applicant: GIESECKE & DEVRIENT GMBH, München (DE)

(72) Inventors: Hermann Drexler, München (DE); Sven Bauer, Vaterstetten (DE); Jürgen Pulkus, München (DE)

(73) Assignee: GIESECKE+DEVRIENT MOBILE SECURITY GMBH, München (DE)

( * ) Notice: Subject to any disclaimer, the term of this patent is extended or adjusted under 35 U.S.C. 154(b) by 205 days.

(21) Appl. No.: 15/525,235

(22) PCT Filed: Oct. 30, 2015

(86) PCT No.: PCT/EP2015/002222
§ 371 (c)(1),
(2) Date: May 8, 2017

(87) PCT Pub. No.: WO2016/074775
PCT Pub. Date: May 19, 2016

(65) Prior Publication Data
US 2017/0352298 A1 Dec. 7, 2017

(30) Foreign Application Priority Data

Nov. 10, 2014 (DE) .................. 10 2014 016 548

(51) Int. Cl.
*H04L 9/06* (2006.01)
*G09C 1/06* (2006.01)
(Continued)

(52) U.S. Cl.
CPC ............ *G09C 1/06* (2013.01); *G06F 9/4403* (2013.01); *G06F 21/12* (2013.01); *G09C 1/00* (2013.01);
(Continued)

(58) Field of Classification Search
CPC ......... G06F 21/60; G06F 21/602; G09C 1/00; G09C 1/06; H04L 9/002; H04L 9/0618;
(Continued)

(56) References Cited

U.S. PATENT DOCUMENTS

2004/0139340 A1 7/2004 Johnson et al.
2009/0158051 A1 6/2009 Michiels et al.
(Continued)

FOREIGN PATENT DOCUMENTS

DE 102014016548 A1 5/2016
WO 2008119901 A2 10/2008

OTHER PUBLICATIONS

"Minimum Requirements for Evaluating Side-Channel Attack Resistance of RSA, DSA and Diffie-Hellman Key Exchange Implementations Part of AIS 46", Federal Office for Information Security, 2013, pp. 1-91.
(Continued)

Primary Examiner — Eric W Shepperd
(74) Attorney, Agent, or Firm — Workman Nydegger

(57) ABSTRACT

A processor device has an executable implementation of a cryptographic algorithm implemented being white-box-masked by a function f. The implementation comprises an implemented computation step S by which input values x are mapped to output values s=S[x], and which is masked to a white-box-masked computation step T' by means of an invertible function f. As a mapping f there is provided a combination (f=(c1, c2, . . . )*A) of an affine mapping A having an entry width BA and a number of one or several invertible mappings c1, c2, . . . having an entry width Bc1, Bc2, . . . respectively, wherein BA=Bc1+Bc2+ . . . . Output values w are generated altogether by the mapping f. Multiplicities of sets Mxi, i=1, 2, . . . =Mx11, Mx12, . . . Mx21, Mx22, . . . are formed from the output values a of the affine mapping A.

17 Claims, 4 Drawing Sheets

(51) Int. Cl.
*G09C 1/00* (2006.01)
*H04L 9/00* (2006.01)
*G06F 9/4401* (2018.01)
*G06F 21/12* (2013.01)
*H04L 9/08* (2006.01)

(52) U.S. Cl.
CPC ............ *H04L 9/002* (2013.01); *H04L 9/0618* (2013.01); *H04L 9/0625* (2013.01); *H04L 9/0631* (2013.01); *H04L 9/0822* (2013.01); *H04L 2209/043* (2013.01); *H04L 2209/08* (2013.01); *H04L 2209/16* (2013.01)

(58) Field of Classification Search
CPC . H04L 9/0625; H04L 9/0822; H04L 2209/04; H04L 2209/043; H04L 2209/16
See application file for complete search history.

(56) References Cited

U.S. PATENT DOCUMENTS

| | | | |
|---|---|---|---|
| 2012/0002807 A1 | 1/2012 | Michiels et al. | |
| 2013/0016836 A1 | 1/2013 | Farrugia et al. | |
| 2015/0270949 A1* | 9/2015 | Michiels | H04L 9/14 380/28 |
| 2016/0078250 A1* | 3/2016 | Michiels | H04L 9/0631 713/189 |

OTHER PUBLICATIONS

Biryukov et al., "A Toolbox for Cryptanalysis: Linear and Affine Equivalence Algorithms", Eurocrypt 2003, 2003, pp. 33-50.

Bos et al., "Differential Computation Analysis: Hiding your White-Box Designs is Not Enough", IACR, 2016, 22 Pages.

Chow et al., "White-Box Cryptography and an AES Implementation", Aug. 16, 2002, pp. 1-18.

Chow et al., "A White-Box DES Implementation for DRM Applications", Oct. 10, 2002, pp. 1-16.

Link et al., "Clarifying Obfuscation: Improving the Security of White-Box Encoding", 2004, 11 Pages.

Herbst et al., "An AES Smart Card Implementation Resistant to Power Analysis Attacks", Springer-Verlag Berlin Heidelberg, 2006, pp. 239-252.

International Preliminary Report on Patentability From PCT Application No. PCT/EP2015/002222, dated May 16, 2017.

International Search Report From PCT Application No. PCT/EP2015/002222, dated Feb. 8, 2016.

Kocher et al., "Differential Power Analysis", 1999, 10 Pages.

Muir, "A Tutorial on White-box AES", Mathematics in Industry vol. 18, Feb. 22, 2013, pp. 209-229.

* cited by examiner $x = xi = x1$ $y1 = (y10, \ldots y1m-1)$
$a(x1,y1) = A(s,y1) = a1(sx1,y1), a2(sx1,y1), \ldots$
$y2 = (y20, \ldots y2m-1)$
$a(x1,y2) = A(s,y2) = a1(sx1,y2), a2(sx1,y2), \ldots$
*(y3)* …

…

$Mxi1 = Mx11 = \{a1(sx1,y1), a1(sx1,y2), \ldots\}$
$Mxi2 = Mx12 = \{a2(sx1,y1), a2(sx1,y2), \ldots\}$
$(Mxi3 = Mx13) \ldots$ $y1 = (y10, \ldots y1m-1)$
$(c1,c2)[a1(sx1,y1), a2(sx1,y1)] = w1(x1, y1), w2(x1, y1)$ $y2 = (y20, \ldots y2m-1)$
$(c1,c2)[a1(sx1,y2), a2(sx1,y2)] = w1(x1, y2), w2(x1, y2)$
*(y3)* …

$Lxi1 = Lx11 = \{c1(a1(sx1),y1), c1(a1(sx1),y2), \ldots\}$
$Lxi2 = Lx12 = \{c2(a2(sx1),y1), c2(a2(sx1),y2), \ldots\}$
$(Lxi3 = Lx13) \ldots$ $i \to i+1 = 2 \to$ $Mxi1 = Mx21 = \{a1(sx2,y1), a1(sx2,y2), \ldots\}$
$Mxi2 = Mx22 = \{a2(sx2,y1), a2(sx2,y2), \ldots\}$
$(Mxi3 = Mx23) \ldots$ $Lxi1 = Lx21 = \{c1(a1(sx2),y1), c1(a1(sx2),y2), \ldots\}$
$Lxi2 = Lx22 = \{c2(a2(sx2),y1), c2(a2(sx2),y2), \ldots\}$
$(Lxi3 = Lx23) \ldots$ $i \to i+1 = 3 \ldots$ $M1 = \{Mx11, Mx21, Mx31 \ldots\}, M2 = \{Mx12, Mx22, Mx32 \ldots\}, \ldots$ $L1 = \{Lx11, Lx21, Lx31 \ldots\}, L2 = \{Lx12, Lx22, Lx32 \ldots\}$ $w1(xi,y) = c1(a1(sxi,y))$ is element of $Lxi1$ for all $i = 1, 2, \ldots$ ?
$w2(xi,y) = c2(a2(sxi,y))$ is element of $Lxi2$ for all $i = 1, 2, \ldots$ ?
$(w3) \ldots$

Fig. 6

HARDENED WHITE BOX IMPLEMENTATION 2

FIELD OF THE INVENTION

The invention relates in general to the technical field of protecting cryptographic algorithms against attacks by means of white-box cryptography. More precisely, the invention relates to a processor device with a white-box implementation of a cryptographic algorithm, in particular of a block cipher, in particular the data encryption standard (DES) or advanced encryption standard (AES).

BACKGROUND OF THE INVENTION

A processor device as intended by the invention is understood to mean an apparatus or other object having a processor, for example a mobile end device such as a smartphone. Software applications—called apps for short—on mobile end devices, for example smartphones, are increasingly being used to carry out cryptographically secured digital transactions, for example for cashless payments at a near-field communication (NFC) terminal or for the purchase of goods or services from an online retailer. Further, software applications for cryptographic services such as speech encryption or data encryption are increasingly being used on mobile end devices such as smartphones. For carrying out the transaction or the service, the software application implemented on the processor of the smartphone interacts with a terminal or server. Cryptographic partial tasks of the software applications such as encryption, decryption, signature formation or signature verification are carried out through implementations of cryptographic algorithms. Security-critical data employed by the cryptographic algorithm, e.g. personal identification numbers (PINs), passwords, cryptographic keys etc., are securely supplied for the processor device. Traditionally, security-critical data are secured against an attack by unauthorized person through (grey-box) cryptography. For this purpose the data are supplied on a security element of the mobile end device, said security element being stand-alone in terms of hardware technology, for example a subscriber identification module (SIM) card removable from the mobile end device.

An alternative approach, which is applicable in particular also for mobile end devices which have no stand-alone security element, is based on the white-box cryptography. In a white-box implementation of a cryptographic algorithm it is attempted to hide the security-critical data, in particular secret cryptographic keys, in the implementation such that an attacker who has full access to the implementation is unable to extract the security-critical data from the implementation. A white-box implementation of the AES crypto-algorithm (Advanced Encryption Standard) is known, for example, from the publication [1] "A Tutorial on White-box AES" by James A. Muir, Cryptology ePrint Archive, Report 2013/104. Likewise, white-box implementations of cryptographic algorithms or routines are distributed commercially.

An ideal white-box implementation of a crypto-algorithm hides security-critical data like cryptographic keys in such a way that they are not ascertainable by an attack.

In the patent application DE 102014016548.5 of the applicant of the present patent application, a method is described for testing a white-box implementation of a cryptographic algorithm, e.g. AES, said implementation being executable on a processor, with which the inventors have succeeded in ascertaining security-critical data by an attack, which according to the concept of the white-box actually should not be possible. From this point of view, the tested white-box implementations are by definition no longer perfect white box due to its attackability, yet are hereinafter still designated as white-box implementations due to their objective of being perfect.

102014016548.5 more precisely describes a test method for a white-box implementation which generates a cipher text from a plain text by means of a secret key, and is present in the processor in the form of machine commands, wherein the processor comprises at least one register. The method comprises the following steps: (a) feeding one plain text of a plurality of plain texts to the white-box implementation; (b) reading out and storing the contents of the at least one register of the processor stepwise while processing the machine commands of the white-box implementation stepwise, wherein intermediate results can be generated while processing the machine commands of the white-box implementation stepwise; (c) repeating the steps (a) and (b) with a further plain text of the plurality of plain texts N-times; and (d) statistically evaluating the contents of the registers and the plain texts, the intermediate results and/or the cipher texts generated from the plain texts by searching for correlations between the contents of the registers and the plain texts, the intermediate results and/or the cipher texts to establish the secret key.

Surprisingly, the examinations of the inventors have shown that for commercially available implementations of cryptographic algorithms under the name of white-box implementations, the secret key may be derived by means of the method described in 102014016548.5.

In the technical publication [3] "Differential Computation Analysis: Hiding your White-Box Designs is Not Enough", J. W. Bos, Ch. Hubain, W. Michiels, and Ph. Teuwen, by the company NXP, there is disclosed a similar test method like in the above-mentioned patent application 102014016548.5, with which the secret key could likewise be ascertained from a white-box implementation of a crypto-algorithm with statistical methods.

In the patent application 102014016548.5, further a directive for action is supplied for a method for hardening the white-box implementation of a cryptographic algorithm executable on a processor. To achieve the hardening, the white-box implementation is configured such that upon generating the cipher text at least one lookup table comes into use to statically map input values of the lookup table to output values of the lookup table. The method comprises the step that the lookup table is statistically permutated such that the individual bits of the permutated lookup table substantially do not correlate with the bits of the lookup table. In other words: the lookup table T is statistically permutated by means of an inverted mapping f (there designated as permutation P) such that the individual bits of the permutated lookup table T'(x)=f(T(x)) do not correlate with the bits T(x) for randomly varying input x. This implementation corresponds to the preamble of claim 1.

Two important theoretical design criteria when designing a crypto-algorithm which processes a plaintext with a key into a ciphertext are diffusion and confusion. Perfect diffusion means that every ciphertext bit depends on all plaintext bits and all key bits. Confusion means applying a preferably complex relation between plaintext, ciphertext and key. Diffusion is frequently generated by applying affine mappings, in particular linear mappings. Good confusion is achieved in particular, but not only, by applying non-linear mappings. The function f, with which a computation step such as a white-box operation S[x] is obfuscated, should also meet the design criteria diffusion and confusion. Generally, affine, in particular linear mappings, are comparatively simple to work on. Mappings of a not specifically specified type can be elaborate to process, and non-linear mappings are definitively more elaborate to process than affine, in particular linear, mappings.

The invention is based on the task of stating a processor device having an implementation of a cryptographic algorithm, which is specially hardened building on an implementation as stated in 102014016548.5 or a comparable one, by output values of computation steps (e.g. S-box operations), i.e. intermediate steps in the algorithm, being, in the implementation, as little as possible or not correlated with output values as they would be expected for unprotected implementations, so that no secret information item from the algorithm can be obtained even by means of statistical methods applied to side-channel outputs. In particular, special implementation details should be stated by means of which a specially hardened implementation can be attained.

SUMMARY OF THE INVENTION

The task is achieved by a processor device according to claim 1. Embodiments of the invention are stated in the dependent claims.

The processor device according to claim 1 is equipped with an executable, white-box-masked implementation of a cryptographic algorithm implemented thereon. The algorithm is configured to generate an output text from an input text while employing a secret key K. The implementation comprises an implemented computation step S of the algorithm by which computation step S input values x are mapped to output values s=S[x], and which is masked by means of an invertible function f to a white-box-masked computation step T'. To this extent the processor device corresponds to those of the application 102014016548.5.

The implementation according to the invention is characterized by the fact that it is configured as a hardened implementation and the hardening of the implementation is attained by a targeted construction of the function f.

To achieve the hardening, the following measures are provided.

a) As a mapping f, a combination (f=(c1, c2, ... )*A) is provided of an affine mapping A having an entry width BA and a number of one or several invertible mappings c1, c2, having an entry width Bc1, Bc2, ... respectively, wherein BA=Bc1+Bc2+ ... , wherein through the mapping f output values w are generated. Specifically in the case of several invertible mappings c1, c2, ... such a split-up of the function f has the advantage that each individual mapping ci, i=1, 2, ... has a more narrow entry width than the total function f and the affine function and is therefore easier to handle.

Frequently affine, in particular linear, operations are realized in white-box implementations, which are carried out with arbitrary invertible, in particular non-linear, obfuscated computation steps by means of table calls. The table size and thus the memory requirement of the white-box implementation is determined by the entry width of the arbitrary invertible, in particular non-linear, mappings. For that reason it is advantageous to split up the function f into an affine, in particular linear, mapping A and several invertible, in particular non-linear, mappings ci, i=1, 2, .... The several, e.g. a number n, arbitrary invertible or non-linear mappings have an entry width of only 1/n of the entry width of the affine or linear mapping A. The number of the different elements to which ci, i=1, 2, ... are applied, amounts to 2^ entry width. Therefore the memory requirement is drastically reduced by the split-up. For the sake of clearness, the above analysis as to the entry width of tables was done on tables, does, however, hold analogously for the entry widths of differently represented mappings. Therefore, by the split-up according to step
a), the function f is made to be more easily handled for the white-box masking.

b) The affine mapping A is configured to be applied to output values s of the computation step S and additionally to one or several obfuscation values y which are statistically independent of the output values s of the computation step S, according to a=A(S[x], y)=A(s, y);

c) The one or several invertible mappings c1, c2, ... are configured to map output values a of the affine mapping A to output values w of the mapping f, according to w=(c1, c2, ... )(A (s,y)), wherein each c1, c2, ... has in particular a manageable narrow entry width.

d) The invertible mappings c1, c2, ... are constructed by a construction method, wherein:

d1) the output values a of the affine mapping A are represented as a concatenation of output-value parts a=a1|a2 ... and the output values w of the mapping f are represented as a concatenation of output-value parts w=w1|w2 ... , wherein output-value parts a1, a2, ... and w1, w2, ... respectively have the same entry width Bc1, Bc2, ... as the invertible mappings c1, c2, ... ;

d2) an input value x=xi is set;

d3) the affine mapping A is applied with fixed input value xi on s=S [xi] and all possible obfuscation values y, whereby for each output-value part a=a1, a2, ... a corresponding set Mxi=Mxi1, Mxi2, ... is formed, wherein each set Mxi1, Mxi2 ... contains one or several different values of the corresponding output-value part a1, a2, ... ; and the invertible mappings c1, c2, ... are applied to the thus generated output-value parts a1, a2, ... in order to generate output-value parts w=w1, w2, ... , whereby for each output-value part w=w1, w2, ... a corresponding set Lxi=Lxi1, Lxi2, ... is formed, wherein each set Lxi1, Lxi2, ... contains one or several different values of the corresponding output-value part w1, w2, ... ;

d4) step d3) is carried out for all possible input values x=xi, i=1, 2, ... according to step d2), so that pluralities of sets Mxi, i=1, 2, ... =Mx11, Mx12, Mx21, Mx22, ... and Lxi, i=1, 2, ... =Lx11, Lx12, ... Lx21, Lx22, ... are formed;

d5) sets M1={Mx11, Mx21, Mx31 ... }, M2={Mx12, Mx22, Mx32 ... } ... and L1={Lx11, Lx21, Lx31 ... }, L2={Lx12, Lx22, Lx32 ... } ... are formed; and d6) the one or several invertible mappings c1, c2, ... are selected or formed such that the sets M1, M2, ... are mapped to the sets L1, L2, ... .

The mappings c1, c2, ... are constructed such that by applying the mappings c1, c2, ... to the sets M1, M2, ..., sets L1, L2, ... arise, which again correspond to the sets M1, M2, ... . In other words, the division of the pre-image set (consisting of elements ai) is retained in sets Mx1i, Mx2i, Mx3i ... by the mapping ci. This means that the image set (consisting of elements wi) possesses the same division into the sets Mx1i, Mx2i, Mx3i.

In this context the inventors speak of "paths" Mx11, Mx21, Mx31, ... and Lx11, Lx21, Lx31, .... The mappings c1, c2, ... are constructed path-preserving, which means that pre-image set and image set consist of the same paths. Experimental examinations have shown that with such path-preservingly constructed invertible mappings c1, c2, ... less correlations are generated in output values than with arbitrarily selected invertible mappings c1, c2, ... , so that a better resistance of the implementation against the described side-channel attacks is achieved.

Hence a processor device is created according to claim 1 with a specially hardened implementation for which output values of computation steps (i.e. intermediate results) are so protected that no secret information item from the algorithm can be obtained even by means of statistical methods applied to side-channel outputs.

→ Subclaims to c1, c2, . . . .

Electively there are provided as invertible mappings c1, c2, . . . complex mappings, by which confusion is generated. Electively there are provided as invertible mappings c1, c2, . . . in particular non-linear mappings so that a high degree of confusion is generated.

Electively one or several of the invertible mappings ci are further selected or formed such that there holds Mx1i=Lx1i, Mx2i=Lx2i, . . . so that thus—in the above terminology—strict path-preserving is safeguarded.

→ Subclaims to A

As an affine mapping electively a mapping is provided by which diffusion is generated, for example a linear mapping or a mapping comprising a linear mapping.

Hereinafter, preferred embodiments of the affine mapping are stated for which the combination with the invertible mappings c1, c2, . . . according to the invention is particularly advantageous.

Electively the affine mapping A is further configured such that each bit in the output values w of the affine mapping A depends on at least one bit of the obfuscation values y, by which is attained that the output values of the affine mapping A are statistically balanced. In this way, an output result of the function f is consequently likewise statistically balanced. By this preferred embodiment it is attained by the construction according to the invention of the invertible mappings c1, c2, . . . and the therefore attained "path preserving" that the statistical balance of the output values of A, said balance being attained by means of the affine mapping A, leads to a statistical balance of the output values w of the function f. In other words, due to the path-preserving of the invertible mappings c1, c2, . . . the statistical balance of the affine mapping A is retained and further transferred to the entire function f. If, in contrast, the invertible mappings c1, c2, . . . are constructed arbitrarily, the path preserving is safeguarded at best randomly and not safeguarded as a rule. As a result of this, the statistical balance still present in the affine mapping A is again partly or completely destroyed.

By constructing the function f while employing an affine mapping A so configured, it is achieved that the individual bits of the masked computation step T' substantially do not correlate with the bits of the unmasked computation step S. In this way no information items about the cryptographic key can be obtained by recording the side-channel outputs of the computation step and applying statistical methods to the side-channel outputs.

The affine mapping A comprises electively a linear mapping which is formed by a matrix MA, which is organized in columns and rows, wherein the output values s of the computation step S and the statistically independent obfuscation values y are associated with separate columns in the matrix MA. Such a separate arrangement increases the clarity.

Electively, in each row of such a matrix MA having separate columns for output values s of the computation step S and the statistically independent obfuscation values y there is a non-zero value contained in at least one of the columns having statistically independent values y. As a result of this, it is ensured that at least one obfuscation value y goes into each row of an output vector w which is generated by the application of the matrix MA to an input vector (s,y).

Otherwise it could happen that in one row of the output vector w, the obfuscation values y fall out because all matrix values a belonging to y of the matrix MA are zero in this row.

Hereinafter, further advantageous embodiments beyond the special embodiment of the affine mapping are viewed.

→ Further subclaims

For carrying out the implementation of the white-box-masked computation step T', electively a look-up table STab[x] representing the computation step S is represented. In this case the obfuscation values y are supplied separately. Alternatively, a look-up table STab[x,y] representing the computation step S and the obfuscation values y are supplied so that a separate supplying of the obfuscation values is omitted.

Electively the white-box-masked computation step T' is represented by a white-box-masked look-up table T'Tab [x, y] in which values f(s, y) are recorded, in particular the result of the application of the one or several invertible mappings c1, c2, . . . to A (s, y).

Electively the implementation additionally comprises a further invertible function g to be applied to input values x of the computation step S, or to input values x of the computation step S and to obfuscation values y according to $g^{-1}(x)$ or $g^{-1}(x, y)$.

Electively there is provided as an algorithm a block cipher having several rounds, in particular DES or AES, and as a computation step S:

one or several SBox operations or one or several inverse SBox operations, respectively of one round; or a combination of one or several SBox operations or one or several inverse SBox operations, respectively of one round, with one or several further operations of the round.

As an input value x, there is/are electively provided either one or several expanded right entry bits r'i (r'1|r'2 . . . ) of a round, or a linkage (x=r'1 XOR k1|r'2 XOR k2| . . . ) of one or several expanded right entry bits r'i of a round with one or several key bits ki.

Hereinafter preferred embodiment possibilities of implementations are set forth, for which the Data Encryption Standard DES is provided as an algorithm.

For implementations having algorithm DES, there is or are provided as obfuscation value y electively one or several left entry bits li of the round. This is the case for example for the DES representation of FIG. 1.

For the algorithm DES, the obfuscation values y are further electively computed by means of a function V from one or several left entry bits li of the round or/and from one or several expanded right entry bit r'i of the round. This is the case for example for the alternative DES representation of FIG. 2, 3.

For algorithm DES with a computation step S, which is implemented as a combined operation T with further operations, electively the further operations comprise one or several the following: permutation P; expansion E; addition of left and right entry bits 1, r or left and expanded right entry bits 1, r'.

If AES is provided as algorithm, there is provided as an input value x electively an input value or part of an input value of an AddRoundKey operation or a SubBytes operation or an inverse SubBytes operation of an AES round.

For algorithm AES, electively the obfuscation values y are computed respectively by means of a function V.

For algorithm AES, the further operations comprise electively one or several of the following: MixColumn operation or one or several substeps of the MixColumn operation or inverse MixColumn operation or one or several substeps of the inverse MixColumn operation.

Electively the obfuscation values y are computed respectively by means of a function V from bits of the input text.

The algorithm electively has several rounds, wherein the function V is newly chosen for every round.

Electively V is a linear mapping or a hash function.

Electively the computation step S has been implemented as a white-box-masked computation step T' on the processor device by means of an implementation method. Electively the white-box-masked computation step T' has been implemented on the processor device in white-box-masked form in that: (i) the (unmasked) computation step S has been carried out to generate output values s, and (ii) the invertible function f has been applied to the generated output values s of the computation step S, and a thereby achieved result has been implemented on the processor device. In applying the invertible function f, in particular the affine mapping and the invertible mappings c1, c2, . . . were applied.

When the processor device is put into operation and thereby the cryptographic algorithm is executed, e.g., within a software application, then white-box-masked operations T' (e.g. Ti', cf. in particular embodiment from FIG. 4) are executed. By executing the white-box-masked operations T', the computation steps S (in particular e.g. the DES-specific S-box operations) are executed in hardened white-box masked form. Because the computation steps S (e.g. S-boxes) are implemented not in direct form in the processor device, but merely the computation steps S white-box-masked to T' according to the invention, attacks on the processor device are prevented or at least considerably impeded. The same holds if the computation step S (e.g., S-box) is embedded in a combined computation step T (cf. FIG. 2, 3). Also, the combined computation step T is never directly implemented in the processor device but always in white-box-masked form T' only.

BRIEF DESCRIPTION OF THE DRAWINGS

Hereinafter the invention will be explained more closely on the basis of exemplary embodiments and with reference to the drawings, in which are shown:

FIG. 6 in schematized representation, a method for filtering out suitable and unsuitable invertible mappings c1, c2 in a function f split up according to FIG. 5, according to embodiments of the invention.

DETAILED DESCRIPTION OF EMBODIMENT EXAMPLES

Figure 1:
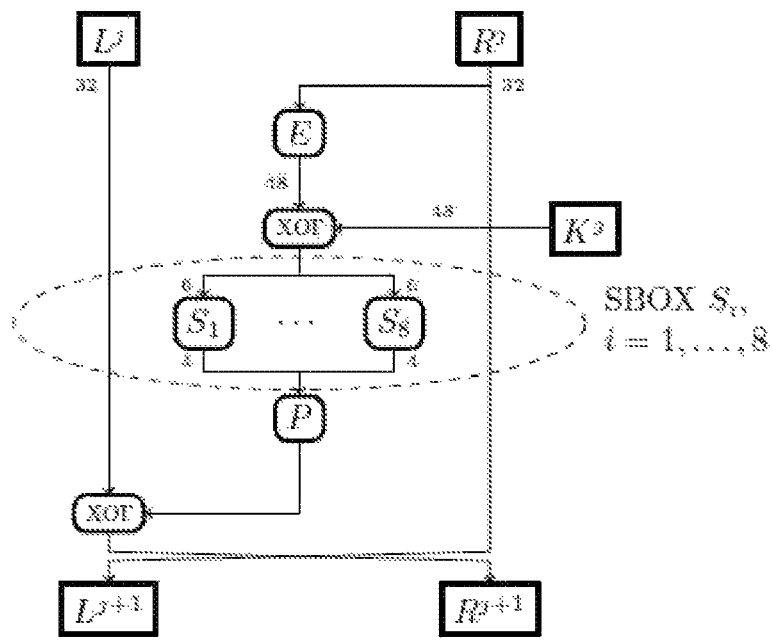
FIG. 1 a DES round in standard representation, according to the prior art, suitably as the basis of the invention.

FIG. 1 shows a DES round according to the prior art. By means of FIG. 1 it is indicated that a computation step S, as is the basis of the invention, can be for example a S-box operation or the totality of the eight S-boxes of a DES round. At the entry of a DES round, 64 bit entry data are divided into 32 bit left side L=lj, j=0, . . . , 31 and 32 bit right side R=rj, j=0, . . . , 31. The bits of the right side R are expanded by means of an expansion operation to 48 bit expanded entry data E=r'j, j=0, . . . , 47 of the right side. The 48 bit expanded entry data E having 48 bit key data K=kj, j=0, . . . 47 are linked by means of an XOR operation to input values xj=rj XOR kj, j=0, . . . , 47 for eight S-boxes S. Each of the eight S-boxes S=S1, . . . S8 processes six bits input values xj to respectively four bits output values sj. The four-bit-wide output values sj of the eight S-boxes S=S1, . . . S8 are fed to a permutation operation P. The output values of the permutation P are XORed with bits of the left side and fed to the next DES round. For standard DES, the DES round ends here.

Figures 3, 4:
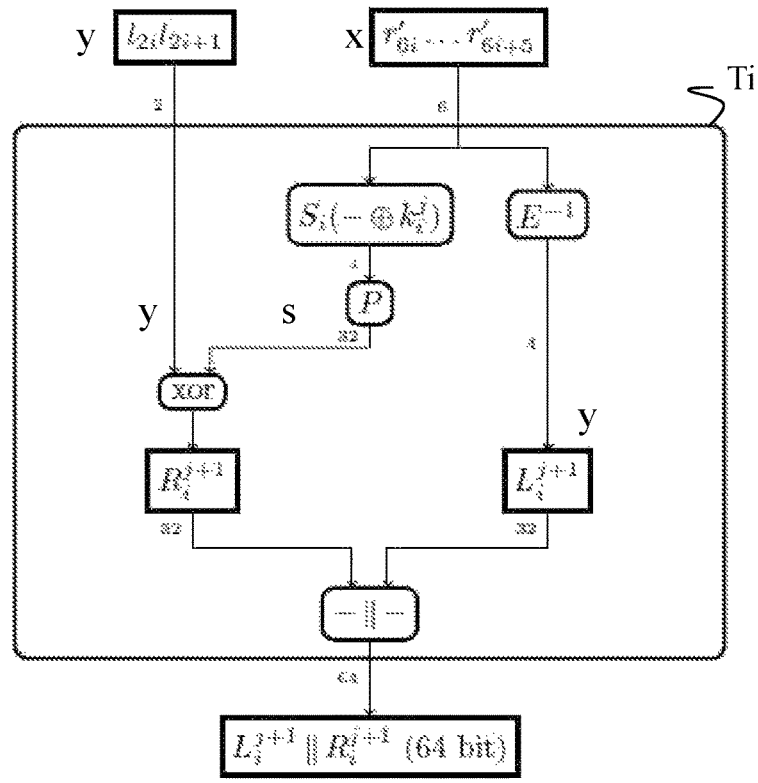
FIG. 3 a detail representation of an individual operation T in the DES round of FIG. 2.
FIG. 4 a first part of a white-box masking of a DES round according to FIG. 1, or according to FIG. 2 and FIG. 3, carried out by applying an affine mapping A, according to embodiments of the invention.

According to the invention, and as represented in FIG. 4, a first part of a white-box masking is applied to the DES S-box Si (dashed encircled region in FIG. 1) by applying an affine mapping A which comprises a linear mapping MA or in a special case is also formed by a linear mapping MA. For the first part of the white-box masking, the output values sj of the S-boxes are fed to a matrix MA by which the linear mapping is represented in the affine mapping A according to a=A(S[x])=MA(S[x]). Further, in addition to the output values sj of the S-boxes, statistically independent values y are fed to the matrix MA, for example two or more bits lj, j=0, . . . , 31 of the left side 64 bit entry data at the entry of the DES round. To attain, according to an especially advantageous embodiment of the invention, the special hardening of the white-box masking already in this first masking step, the matrix MA is so configured that in addition to the S-Box output values sj, incoming values y are statistically independent of the S-Box output values sj, and that each bit in the output values a of the matrix MA depends on at least one bit from the obfuscation values y. Alternatively other embodiments of the matrix MA are possible.

Hereinafter there is set forth by means of FIG. 2 and FIG. 3 an alternative particularly suitable representation of a DES round for implementing the invention, in which the operations specific to a DES round S-box operation S and permutation P are summarized in a combined operation T or T-box operation. In so doing, the first part of the white-box masking will be applied with the mapping A, or concretely with the matrix MA, to the combined operation T, in which the S-Box operation is contained (see FIG. 4).

Figure 2:
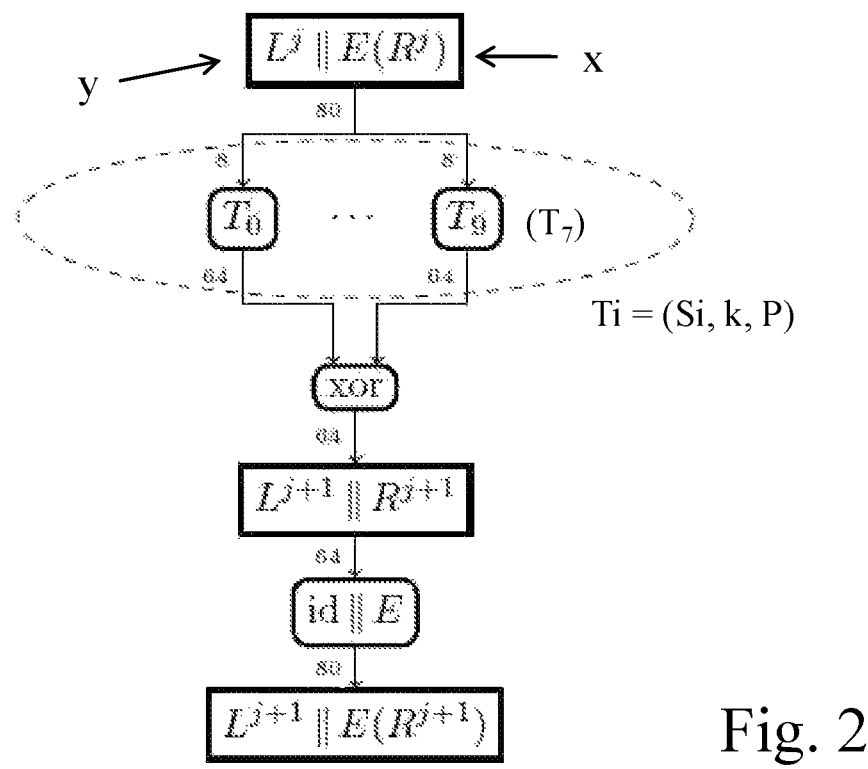
FIG. 2 a DES round in an alternative representation, having S-box operations S embedded in operations T, and specifically suitably as the basis of the invention.

FIG. 2 shows a DES round in an alternative representation, specifically suitably for the application of a white-box masking according to the invention. At the entry of the DES round, first as in FIG. 1, 64 bit entry data are divided into 32 bit left side L=lj, j=0, . . . , 31 and 32 bit right side R=rj, j=0, . . . 31, and the bits of the right side are expanded to 48 bit E(Rj). For the alternative representation of FIG. 2, two or more bits of the 32 bit L=lj, j=0, . . . , 31 of the left side of the round entry data are employed as obfuscation width y. In this way, upon executing the DES round, the DES-specific eight S-box operations are executed by the fact that a multiplicity of eight or ten combined operations T=T0, . . . T7 or T0, . . . T9 is carried out, in which the S-Box operations S=S1, . . . S8 are comprised.

FIG. 3 shows the detailed structure of an individual combined operation T=Ti, i=0, . . . 7 (or 0, . . . 9 where applicable) of FIG. 2. (Optionally additionally present padding with zero bits and shifts are omitted in FIG. 3 in favor of better clarity.) In the combined operations T=Ti of FIG. 2 and FIG. 3, as opposed to the S-boxes S of the DES representation of FIG. 1, the keys kj and the DES-typical permutation P are already taken into account in the operation T. The S-box with the key kj taken into account is represented in FIG. 3 by the operation box Si (-XORkij), the permutation by P. Further, before the computation step S, thus before the S-box operations S1, . . . , S8, eight (or ten) overall tables T0, . . . T7 (or T0, . . . T9) are generated, in which respectively six-bit entry values xj=rj, j=0, . . . 47 (now not XORed with k, because the key bits kj are already contained in S) for the eight S-boxes S and two-bit obfuscation values lj, j=0, . . . 31 are contained and for ten overall tables Ti further bits obfuscation values lj, j=0, . . . 31 are contained. Here, the two (or more) bit obfuscation values lj are not processed by the S-boxes. The respectively six bit entry values xj=rj XOR kj are respectively processed by an S-box. Therefore the overall tables Ti deliver output values which contain exit values sj of the S-boxes as well as obfuscation values lj.

As represented in FIG. 4, the first part of the white-box masking of the implementation is carried out by feeding the output values of the combined operations (overall tables) Ti to the matrix MA according to the invention by which the affine mapping A according to the invention is represented. Here, the exit values S(x) of the computation step S, bits of the entry value x, i.e. bits rj of the right side, as well as the statistically independent values y, i.e. the bits employed as obfuscation values lj of the left side of the DES round entry value, are fed to the matrix MA. A separate fetching of the statistically independent values y=lj is not required here, because they are already contained in the combined operation T. For this reason the DES representation of FIG. 2 is particularly well suitable for implementing the invention. The result of the masking are partially white-box-masked operations. These partially white-box masked operations are subsequently still masked with invertible mappings c1, c2, . . . to (completely) white-box masked operations Ti', i=0, . . . 9 or i=0, . . . 7 (cf. FIG. 5, 6) and thereupon implemented in the processor device.

In the embodiment of FIG. 4, the affine mapping A contained in the mapping f employed in the white-box masking is configured as a matrix MA, having coefficients aij, i=0, . . . l-1, j=0, . . . n+m-1.

The matrix MA is multiplied by the entry vector (s,y), which contains S-box exit values s=S[x] (x are e.g. bits r of the right side) and obfuscation values y (e.g. bits of the left side) to generate an exit vector a. The sum formula in FIG. 4 illustrates this aspect for an individual row i having the coefficients aij (j=0, n+m-1) of the matrix MA, and a thereby generated individual record αi of the exit vector a. In the entry vector (s,y), the S-box exit values s are contained in the upper n records and the obfuscation values y in the lower m records. In the matrix MA are correspondingly contained on the left the n coefficients aij, j=0, . . . n-1 of MA to be multiplied with the S-box exit values s=s0, . . . sn-1. On the right in the matrix MA are contained the m coefficients aij, j=n, . . . n+m-1 of MA to be multiplied with the obfuscation values y=y0, . . . ym-1.

The matrix MA is constructed according to a particularly advantageous embodiment such that the effect is achieved that the right sum of the sum equation for αi (note: individual bits of a are designated with αi, further below sequences of one or several bits αi with ai)

$$\Sigma_{j=0}^{m-1} a_{i,n+j} y_j$$

disappears for no row index i, i=0, . . . l-1. This effect is attained by the fact that in every row i, at least one of the coefficients ai, n+j, j=0, . . . m-1, which are to be multiplied with the obfuscation values y=yj, j=0, . . . m-1, is non-zero. Through the effect it is ensured that in no row i, i=0, . . . l-1 the obfuscation values y in the output vector a disappear, thus in every row i in the record αi of the output vector a at least one obfuscation value yj is contained. This in turn has the further-reaching effect that the output values a of the affine mapping A are statistically balanced.

Figure 5:
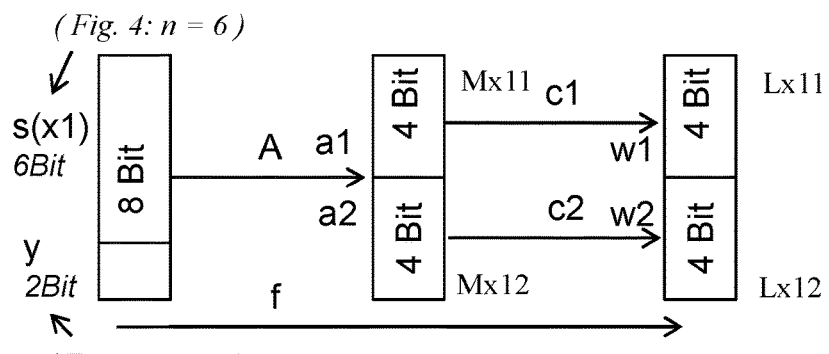
FIG. 5 a function f split up into an affine mapping A and two invertible mappings c1 and c2 for white-box masking a DES round according to FIG. 1, or according to FIG. 2 and FIG. 3, to S-box-output values s (x1), s (x2), s (x3), . . . achieved for different input values x1, x2, x3, according to embodiments of the invention.
Figure 5:
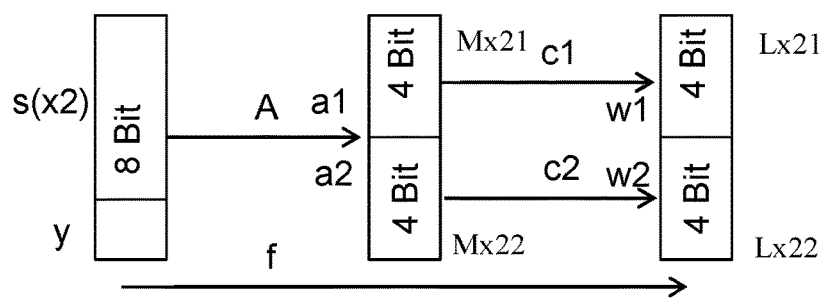

FIG. 5 shows a function f for white-box masking a DES round according to FIG. 1, or according to FIG. 2 and FIG. 3, according to embodiments of the invention. The function f is split up into an eight-bit wide affine mapping A and two respectively four bit wide invertible mappings c1 and c2. The function f is applied to six bit wide S-box output values s(x) and two bit wide obfuscation values y. In the image of FIG. 4, the width of the S-box exit values thus is n=6 and the width of the obfuscation values m=2: According to FIG. 5, different input values x=x1, x2, x3, . . . respectively are successively stipulated and the masking f=c(A(s(x),y)) carried out with every input value x=x1, x2, x3, . . . .

First, an input value x to be processed by S-boxes of the DES round is set. FIG. 5 shows three such set input values x, namely x1, x2 and x3, for three executions of a DES round masking.

A DES S-box operation is applied to the input value x so that six bit s(x) are generated, i.e. six bit s(x1) or s(x2) or s(x3) etc. In addition, two bit statistically independent obfuscation values y are supplied.

For the respective x=x1, x2, x3, . . . thus altogether eight bit data are supplied, namely six bit S-box-output values s(x) and two bit obfuscation values y as an input values for the affine mapping A (e.g. matrix MA).

The affine mapping A is applied to the six bit output values s(x) of the computation step S and the two bit statistically independent obfuscation values y, according to a=A(S[x], y)=A(s, y).

Through the two invertible mappings c1, c2, output values a of the affine mapping A are mapped to output values w of the mapping f, according to (w1, w2)=(c1, c2)((a1, a2) (s(x),y))=(c1, c2)(A (S[x],y)).

The output values a of the affine mapping A are in this connection represented as a concatenation of each four bit wide output-value parts a=a1|a2. The output values w of the mapping f are represented as a concatenation of output-value parts w=w1|w2. The output-value parts a1, a2, and w1, w2, respectively have the same entry width Bc1, Bc2 as the invertible mappings c1, c2. In the embodiment example of FIG. 5, a1, a2, w1, w2, c1 and c2 respectively are four bit wide. Here it should be noted that output-value parts are designated with ai which are one or several bit wide, and individual bits are designated with αi. Correspondingly, output-value parts are designated with wi which are one or several bit wide, and individual bits are designated with σi.

The invertible mappings c1, c2 are constructed by the following construction method.

The affine mapping A is applied with fixed input value x1 (upper image half) to s=S [x1] and all possible obfuscation values y (the running through of the possible obfuscation values is represented in more detail in FIG. 6) by which for each output-value part a=a1, a2 a corresponding set Mx11, Mx12 is formed. Each set Mx11, Mx12, contains one or several different values of the corresponding output-value part a1, a2. The sets Mx11, Mx12 are also designated as paths.

Thereafter the affine mapping A is applied with fixed input value x2 (lower image half) to s=S[x2] and all possible obfuscation values y (cf. also FIG. 6) are applied. As a result of this, a corresponding set Mx21, Mx22 is formed for each output-value part a=a1, a2. Each set Mx21, Mx22, contains one or several different values of the corresponding output-value part a1, a2.

The invertible mappings c1, c2 are applied to the thus generated output-value parts a1, a2 to generate output-value parts w=w1, w2.

As a result of this, a corresponding set Lx11, Lx12 or Lx21, Lx22 is formed for each output-value part w=w1, w2. In doing so, each set Lx11, Lx12 or Lx21, Lx22 contains one or several different values of the corresponding output-value part w1, w2.

For all further possible input values x3, . . . the method is likewise applied.

Further the following sets are formed:
M1={Mx11, Mx21, Mx31 . . . } (paths of the pre-image set of c1),
M2={Mx12, Mx22, Mx32 . . . } (paths of the pre-image set of c2),
L1={Lx11, Lx21, Lx31 . . . } (for correct c1 paths of the image set of c1),
L2={Lx12, Lx22, Lx32 . . . } (for correct c2 paths of the image set of c2).

The invertible mappings c1, c2 are selected or formed such that the set M1 is mapped to the set L1 and the set M2 is mapped to the set L2. The mappings c1 and c2 are thus path preserving because pre-image set and image set contain the same paths.

FIG. 6 shows, in the form of a pseudo program code, the construction methods represented in FIG. 5, and in particular the running through of the possible values of the obfuscation value vector y. In FIG. 6, compared with FIG. 5, the bit width of the obfuscation-value vector y is generalized from two to m. Thus, obfuscation values y=(y0, . . . ym−1) are employed. For the construction method, input values xi, i=1, 2, 3, . . . are incremented with the help of the index i, a program loop i is run through for each value of the index i, the possible obfuscation values y run through within the i program loop, and sets formed analogously as described on the basis of FIG. 5. The exit of the affine mapping A is again represented as a concatenation of a=a1|a2| . . . .

First, a n bit wide input value vector x=x1 is stipulated. The input-value vector x1 is processed, e.g. according to FIG. 1 or FIG. 3, by DES S-boxes to S-box output values s(x1).

Further, a first possible value y1 for the m bit wide obfuscation value vector y1=(y10 . . . y1m−1) is stipulated. The S-box-output values s(x1) and the obfuscation values y1=(y10, . . . y1m−1) are fed to the affine mapping A, according to a (x1, y1)=A(s(x1),y1)=a1 (s(x1), y1)|a2 (s(x1), y1), . . . .

Now a second possible value y2 for the m bit wide obfuscation-value vector y2=(y20, . . . y2m−1) is stipulated. The S-box output values s(x1) and the obfuscation values, now y2=(y20 . . . y2m−1), are fed to the affine mapping A, according to a (x1, y2)=A (s(x1), y2)=a1 (s(x1), y2)|a2 (s(x1), y2), . . . .

This method is carried out, with fixed x1, for all further possible values of the obfuscation-value vector y= y3, =(y30, . . . y3m−1) . . . .

With the generated results a1( ), a2 ( ), . . . , with fixed x1, of the affine mapping A, mapping sets M of the affine mapping A are generated according to Mx11={a1(s(x1),y1), a1(s(x1),y2), . . . }, Mx12={a2(s(x1),y1), a2(s(x1), y2), . . . }, Mx13= . . . , etc.

The invertible mappings c1, c2, . . . are applied to the thus generated output values of the affine mapping A. The mappings c1, c2, . . . are therefore likewise applied with fixed x1 for all possible values obfuscation values y=y1, y2, y3, . . . . With y1, an operation c1, c2, . . . is applied to a1(s(x1),y1), a2(s(x1), y1) . . . and w1 (x1, y1), w2 (x1, y1) . . . generated. With y2, an operation c1, c2, . . . applied to a1(s(x1),y2), a2(s(x1), y2) . . . and w1 (x1, y2), w2 (x1, y2) . . . generated.

With the output values w of the invertible mappings c1, c2, . . . , mapping sets L of the invertible mappings c are generated for x1 according to Lx11={c1(a1(s(x1),y1),c1(a1(s(x1),y2), . . . }, Lx12={c2(a2(s(x1),y1),c2(a2(s(x1),y2), . . . }, Lx13= . . . ,etc.

After all values of the obfuscation value vector y have been run through, the index for the input value vector x is incremented by one to two (i→i+1=2) so that now x to x2 is stipulated. The input value x2 is processed by the S-box operation to s(x2).

Now all possible obfuscation values y1, y2 are run through for x2. In this way, mapping sets of the affine mapping A are generated for x2, analogously as previously for x1, according to Mx21={a1(sx2,y1), a1(sx2,y2), . . . }, Mx22={a2(sx2,y1), a2(sx2,y2), . . . }, Mx23= . . . , etc.

In corresponding manner, mapping sets L of the invertible mappings C are formed for x2 according to Lx21={c1(a1(s(x2),y1),c1(a1(s(x2),y2), . . . }, Lx22={c2(a2(s(x2),y1),c2(a2(s(x2),y2), . . . }, Lx23= . . . ,etc.

The same method is carried out for all further possible values of x, thus x=x3, . . . , by incrementing the index i=3, . . . and respectively running through all possible y.

The mapping sets M of the affine mapping A and the mapping sets L of the invertible mappings c1, c2, . . . are summarized as follows.

M1={Mx11,Mx21,Mx31 . . . },M2={Mx12,Mx22, Mx32 . . . }, . . .

L1={Lx11,Lx21,Lx31 . . . },L2={Lx12,Lx22, Lx32 . . . }

Now it is checked whether the invertible mappings c1, c2, . . . meet the condition that they are path-preserving. It is checked for each function ci that the paths Mx1i, Mx2i, Mx3i . . . of the set Mi correspond to the paths Lx1i, Lx2i, Lx3i . . . of the set Li. If this is the case, ci meets the construction instruction. If the image set of a function ci disintegrates into other paths than the corresponding pre-image set, the construction instruction is thus not met and the function ci must be discarded.

When the processor device is put into operation and thereby the cryptographic algorithm is executed, e.g. within a software application, then the white-box-masked operations Ti' are executed. By executing the white-box-masked operations Ti', in particular the DES-specific S-box operations are executed in hardened white-box-masked form. Because neither the S-boxes S nor the combined S-boxes T are implemented in the processor device in direct form, but merely the S-box operations white-box-masked to T' according to the invention, attacks on the processor device are prevented or at least considerably impeded.

GLOSSARY

S: computation step, in particular DES SBOX or eight DES S-boxes, in particular for standard representation of DES T: operation comprising computation step S, for alternative DES representation
T': white-box-obfuscated computation step S, having S embedded in T where applicable
x: input value in computation step S (or T)
y: obfuscation value
r': expanded right side of the input of a round
k: key
s: output value of S (e.g. S-box)
w: output value of T'(masked S)
If S=DES S-box or eight DES S-boxes:
x=r' XOR k for standard representation of DES
x=r' for alternative representation of DES
l=bits from left side of the bits at the DES round-entry(32 bit)
r=bits from right side of the bits at the DES round-entry (32 bit)
r'=bits from expanded right side r at the DES round-entry (48 bit)

CITED PRIOR ART

[1] "A Tutorial on White-box AES", James A. Muir, Cryptology ePrint Archive, Report 2013/104, eprint.iacr.org/2013/104
[2] DE 102014016548.5 (submitted on 10 Nov. 2014)
[3] "Differential Computation Analysis: Hiding your White-Box Designs is Not Enough", J. W. Bos, Ch. Hubain, W. Michiels, and Ph. Teuwen, eprint.iacr.org/2015/753, retrieved on 31 Jul. 2015

The invention claimed is:

1. A processor device having an executable white-box-masked implementation of a cryptographic algorithm implemented thereon, which is configured to generate an output text from an input text while employing a secret key K, wherein the implementation comprises an implemented computation step S by which input values x are mapped to output values s=S[x], and which is masked to a white-box-masked computation step T' by means of an invertible function f, wherein
  a) as a mapping f, a combination (f=(c1, c2, ... )*A) is provided of an affine mapping A having an entry width BA and a number of one or several invertible mappings c1, c2, ... having an entry width Bc1, Bc2, ... respectively, wherein BA=Bc1+Bc2+ ... , wherein through the mapping f output values w are generated;
  b) the affine mapping A is configured to be applied to output values s of the computation step S and additionally to one or several obfuscation values y which are statistically independent of the output values s of the computation step S, according to a=A(S[x], y)=A(s, y);
  c) the one or several invertible mappings c1, c2, ... are configured to map output values a of the affine mapping A to output values w of the mapping f, according to w=(c1, c2, ... )(A(s,y));
  d) invertible mappings c1, c2, ... are constructed by a construction method, wherein:
    d1) the output values a of the affine mapping A are represented as a concatenation of output-value parts a=a1|a2 ... and the output values w of the mapping f are represented as a concatenation of output-value parts w=w1|w2 ... , wherein output-value parts a1, a2, ... and w1, w2, ... respectively have the same entry width Bc1, Bc2, ... as the invertible mappings c1, c2, ... ;
    d2) an input value x=xi is set;
    d3) the affine mapping A is applied with fixed input value xi on s=S [xi] and all possible obfuscation values y, whereby for each output-value part a=a1, a2, ... a corresponding set Mxi=Mxi1, Mxi2, ... is formed, wherein each set Mxi1, Mxi2 ... contains one or several different values of the corresponding output-value part a1, a2, ... ; and the invertible mappings c1, c2, ... are applied to the thus generated output-value parts a1, a2, ... in order to generate output-value parts w=w1, w2, ... , whereby for each output-value part w=w1, w2, ... a corresponding set Lxi=Lxi1, Lxi2, ... is formed, wherein each set Lxi1, Lxi2, ... contains one or several different values of the corresponding output-value part w1, w2, ... ;
    d4) step d3) is carried out for all possible input values x=xi, i=1, 2, ... according to step d2), so that pluralities of sets Mxi, i=1, 2, ... =Mx11, Mx12, ... Mx21, Mx22, ... and Lxi, i=1, 2, ... = Lx11, Lx12, ... Lx21, Lx22, ... are formed;
    d5) sets M1={Mx11, Mx21, Mx31 ... }, M2={Mx12, Mx22, Mx32 ... } ... and L1={Lx11, Lx21, Lx31 ... }, L2={Lx12, Lx22, Lx32 ... } ... are formed; and
    d6) the one or several invertible mappings c1, c2, ... are selected or formed such that the set M1 and the set L1 are mapped by the mapping c1, the set M2 and the set L2 are mapped by the mapping c2, ... .

2. The processor device according to claim 1, wherein one or several invertible mappings ci are further selected or formed such that there holds Mx1i=Lx1i, Mx2i=Lx2i.

3. The processor device according to claim 1, wherein in b1) the affine mapping A is further so designed that every bit in the output values a of the affine mapping A depends on at least one bit of the obfuscation values y, by which is attained that the output values a of the affine mapping A are statistically balanced.

4. The processor device according to claim 3, wherein the affine mapping A comprises a linear mapping which is formed by a matrix MA, which is organized in columns and rows, wherein the output values s of the computation step S and the statistically independent obfuscation values y are associated with separate columns in the matrix MA; wherein preferably further in each row of the matrix MA in at least one of the columns having statistically independent values y a non-zero value is contained.

5. The processor device according to claim 1, wherein for carrying out the implementation of the white-box-masked computation step T' there has been supplied a look-up table STab[x] representing the computation step S, or a look-up table STab[x,y] representing the computation step S and the obfuscation values y.

6. The processor device according to claim 1, wherein the white-box-masked computation step T' is represented by a white-box-masked look-up table T'Tab [x, y] in which values f(s, y) are recorded including the result of the application of one or several invertible mappings c1, c2, ... to A(s, y).

7. The processor device according to claim 1, wherein the implementation additionally comprises a further invertible function g to be applied to input values x of the computation step S, or to input values x of the computation step S and to obfuscation values y according to $g^{-1}(x)$ or $g^{-1}(x, y)$.

8. The processor device according to claim 1, wherein there is provided as an algorithm a block cipher having several rounds, and as a computation step S:

one or several SBox operations or one or several inverse SBox operations, respectively of one round; or a combination of one or several SBox operations or one or several inverse SBox operations, respectively of one round, with one or several further operations of the round.

9. The processor device according to claim 8 with algorithm data encryption standard (DES), wherein there is/are provided as an input value x either one or several expanded right entry bits r'i (r'1|r'2| ... ) of a round, or a linkage (x=r'1 XOR k1| r'2 XOR k2| ... ) of one or several expanded right entry bits r'i of a round with one or several key bits ki; or/and one or several left entry bits li of the round go into the obfuscation values y.

10. The processor device according to claim 8 having algorithm DES, wherein the obfuscation values y are computed by means of a function V from one or several left entry bits li of the round or/and from one or several expanded right entry bits r'i of the round, wherein V is electively a linear mapping or a hash function.

11. The processor device according to claim 10, wherein the algorithm has several rounds and the function V is newly chosen for every round.

12. The processor device according to any of claim 8, having algorithm DES, wherein the further operations comprise one or several of the following: permutation P; expansion E; addition of left and right entry bits l, r or left and expanded right entry bits l, r'.

13. The processor device according to claim 8 having algorithm advanced encryption standard (AES), wherein there is provided as an input value x an input value or part of an input value of an AddRoundKey operation or a SubBytes operation or an inverse SubBytes operation of an AES round.

14. The processor device according to claim 8 having algorithm AES, wherein the further operations comprise one or several of the following: MixColumn operation or one or several substeps of the MixColumn operation or inverse MixColumn operation or one or several substeps of the inverse MixColumn operation.

15. The processor device according to claim 1, wherein the obfuscation values y are computed respectively by means of a function V from bits of the input text, wherein V is electively a linear mapping or a hash function.

16. The processor device according to claim 15, wherein the algorithm has several rounds and the function V is newly chosen for every round.

17. The processor device according to claim 1, wherein the computation step S has been implemented on the processor device as a white-box-masked computation step T' in that: (i) the computation step S has been carried out to generate output values s, and (ii) the invertible function f has been applied to the generated output values s of the computation step S and the obfuscation values y, and a thereby achieved result T' has been implemented on the processor device.

* * * * *